United States Patent
Abdulrahman

(10) Patent No.: US 11,432,671 B2
(45) Date of Patent: Sep. 6, 2022

(54) SMART PRAYER RUG

(71) Applicant: Thakaa Technologies QSTP-LLC, Doha (QA)

(72) Inventor: Khamis Saleh Abdulrahman, Doha (QA)

(73) Assignee: THAKAA TECHNOLOGIES QSTP-LLC, Doha (QA)

( * ) Notice: Subject to any disclaimer, the term of this patent is extended or adjusted under 35 U.S.C. 154(b) by 0 days.

(21) Appl. No.: 16/984,628

(22) Filed: Aug. 4, 2020

(65) Prior Publication Data

US 2021/0038006 A1    Feb. 11, 2021

Related U.S. Application Data

(60) Provisional application No. 62/884,450, filed on Aug. 8, 2019.

(51) Int. Cl.
| | |
|---|---|
| *A47G 33/00* | (2006.01) |
| *G08B 7/06* | (2006.01) |
| *G06N 20/00* | (2019.01) |
| *G06F 3/14* | (2006.01) |
| *H04W 4/02* | (2018.01) |

(52) U.S. Cl.
CPC ............ *A47G 33/008* (2013.01); *G06F 3/14* (2013.01); *G06N 20/00* (2019.01); *G08B 7/06* (2013.01); *H04W 4/023* (2013.01)

(58) Field of Classification Search
CPC .... A47G 33/008; A47G 27/0237; G08B 7/06; G06N 20/00; G06F 3/14; H04W 4/023
USPC ..................................................... 340/815.45
See application file for complete search history.

(56) References Cited

U.S. PATENT DOCUMENTS

| | | | |
|---|---|---|---|
| 2010/0120005 A1* | 5/2010 | Abouelsaadat | A47G 33/008 434/245 |
| 2011/0294100 A1 | 12/2011 | Jamal | |
| 2017/0065114 A1* | 3/2017 | Almubarak | G09B 19/003 |
| 2018/0061271 A1* | 3/2018 | Mohammed | G09B 5/02 |

FOREIGN PATENT DOCUMENTS

| | | |
|---|---|---|
| CA | 2978784 A1 | 3/2019 |
| DE | 202010010079 U1 | 10/2010 |
| RU | 132974 U1 | 10/2013 |

* cited by examiner

*Primary Examiner* — Omar Casillashernandez
(74) *Attorney, Agent, or Firm* — K&L Gates LLP

(57) ABSTRACT

A system is provided including a processor, a memory, a wireless controller, and a prayer rug. The prayer rug includes a display screen, one or more pressure sensors, and one or more proximity sensors. The prayer rug may also include one or more speakers. The wireless controller is configured to change what is displayed on the display screen. The pressure sensors are configured to sense a change in pressure applied at a number of pressure points and output pressure information. The proximity sensors are configured to sense a distance away an object is from the one or more proximity sensors. The processor is configured to receive pressure information from the pressure sensors and proximity information from the proximity sensors and determine a prayer posture from the received pressure and proximity information. The processor may generate an alert if the determined prayer posture is detected as being incorrect.

18 Claims, 6 Drawing Sheets

SMART PRAYER RUG

PRIORITY CLAIM

The present application claims priority to and the benefit of U.S. Provisional Application 62/884,450, filed Aug. 8, 2019, the entirety of which is herein incorporated by reference.

BACKGROUND

Millions of people of various religious faiths have used prayer mats, rugs, carpets, and the like for centuries. Those of the Islamic faith are required to pray five times a day: a dawn prayer (Fajr), a noon prayer (Dhuhur), an afternoon prayer (Asr), a sunset prayer (Maghrib) and a nightfall prayer (Isha). While it is not required, but Muslims usually use a prayer rug while performing these prayers, as it provides a cleaner surface for the individual to pray on.

Each of these five required prayers requires a set of movements called rakah, which has a (1) Qyam step, wherein the praying individual initially stands at one end of the prayer mat, (2) a Takbeer step, wherein the praying individual must say 'Allahu Akbar' at the beginning of prayer, (3) Reciting Al-Fatihah chapter of the Quran, (4) a Ruku step, wherein the praying individual bends at the waist, (5) a Rising from Ruku step, (6) a Sujud step, wherein the praying individual prostrates, (7) a Julus step, wherein the praying individual sits upright with the knees bent and palms placed on them between two Sujuds and after the second and fourth rakah, (8) a Tashahud step, wherein the praying individual must recite the testimony of faith and As-Salatu Ibrahimiya, (9) a Tasleem step, wherein the praying individual must say 'Asalamu Alaikum' at the end of the prayer, (10) The praying individual must remain at calm, peace, and have full reverence while fulfilling each step, and making certain that each body part assumes the appropriate position before one moves from one position to another, and (11) the praying individual must follow the right order for each of the previous steps. For a rakah to be considered complete, all the steps must be performed correctly.

Each of the five required prayers requires a different number of rakahs, and the rakahs are carried out in differing sequences. In the Fajr, the praying individual accomplishes two rakahs. In the Dhuhur, the praying individual carries out four rakahs, completed in two sets of two rakahs. In the Asr, it's the same as Dhuhur, wherein the praying individual carries out four rakahs accomplished by carrying out two sets of two rakahs. In the Maghrib, the praying individual carries out three rakahs, accomplished in a sequence of two rakahs, followed by one rakah. In the Isha, it's the same as Dhuhur Asr, wherein the praying individual carries out four rakahs, completed in two sets of two rakahs.

In addition to the five required daily prayers, Islam has more than 30 different kinds of optional and mandatory prayers for different kinds of occasions in the Muslim life. For example, funeral prayer, Eid prayer, signs prayer, guidance prayer. Each of these non-daily prayers have different sequences of prayer steps, including different combinations of rakahs.

Accordingly, it is not always easy for praying individuals to keep track of the steps in each of the several prayers, especially the completing of the various rakah sequences. New Muslims, young individuals beginning to learn the several prayers, or individuals suffering from memory loss issues may particularly find it difficult to remember each of the steps.

SUMMARY

A smart prayer rug is provided that includes a display screen, a pressure sensor(s), and proximity sensor(s). The smart prayer rug may also include at least one speaker. The display screen may display a rakah counter, text from the Quran, prayer postures, what to say in each posture, educational information for children and new Muslims, and after prayer Adhkaar. The information can be displayed in multiple languages, translated, or transliterated. The display screen may be controlled by a wireless controller. For example, the wireless controller may change what is displayed on the display screen or may turn the screen on or off. The pressure sensor(s) provides information about the pressure an individual applies at various pressure points on the prayer rug. The proximity sensor(s) provides information about a distance an object (e.g., an individual's head) is away from the proximity sensor(s).

In some examples, the prayer rug may analyze the pressure and proximity information output from the sensors via a software application. In other examples, the prayer rug may transmit the pressure and/or proximity information to an external device or server that hosts the software application. The software application is able to detect the prayer postures that individuals are in and whether they are performing them correctly. The device or server may also host a machine learning model that may analyze the pressure information and better understand the postures that individuals are in.

In one example, a system includes a processor, a memory, a wireless controller, and a prayer rug. The prayer rug includes a display screen, one or more pressure sensors, and one or more proximity sensors. The one or more proximity sensors are configured to sense a distance away an object is from the one or more proximity sensors and output proximity information. The one or more pressure sensors are configured to sense a change in pressure applied at a plurality of pressure points and output pressure information. The plurality of pressure points are configured such that the pressure sensors sense a change in pressure across at least two-thirds of the surface of the prayer rug. The wireless controller is in communication with the prayer rug and is configured to change what is displayed on the display screen.

The memory stores prayer posture information including posture information for a plurality of prayers. The processor is in communication with the memory. The processor is configured to receive pressure information from the one or more pressure sensors and proximity information from the one or more proximity sensors. A prayer posture of an individual is determined based on the received pressure and proximity information. The determined prayer posture is compared with the stored prayer posture information. If the determined prayer posture does not match the stored prayer posture information, an alert is generated.

DETAILED DESCRIPTION

The present disclosure generally relates to a smart rug. More specifically, the present disclosure provides for a smart prayer rug that detects when an individual is performing various prayer postures and displays information about a prayer (e.g., prayer steps) on a display screen. The prayer rug may be connected to a software application hosted on an external device. Throughout this disclosure, reference is made herein to a prayer rug; however, in other aspects of the present disclosure a prayer rug may also refer to a prayer carpet, mat, or any other similar article of material.

Figure 1:
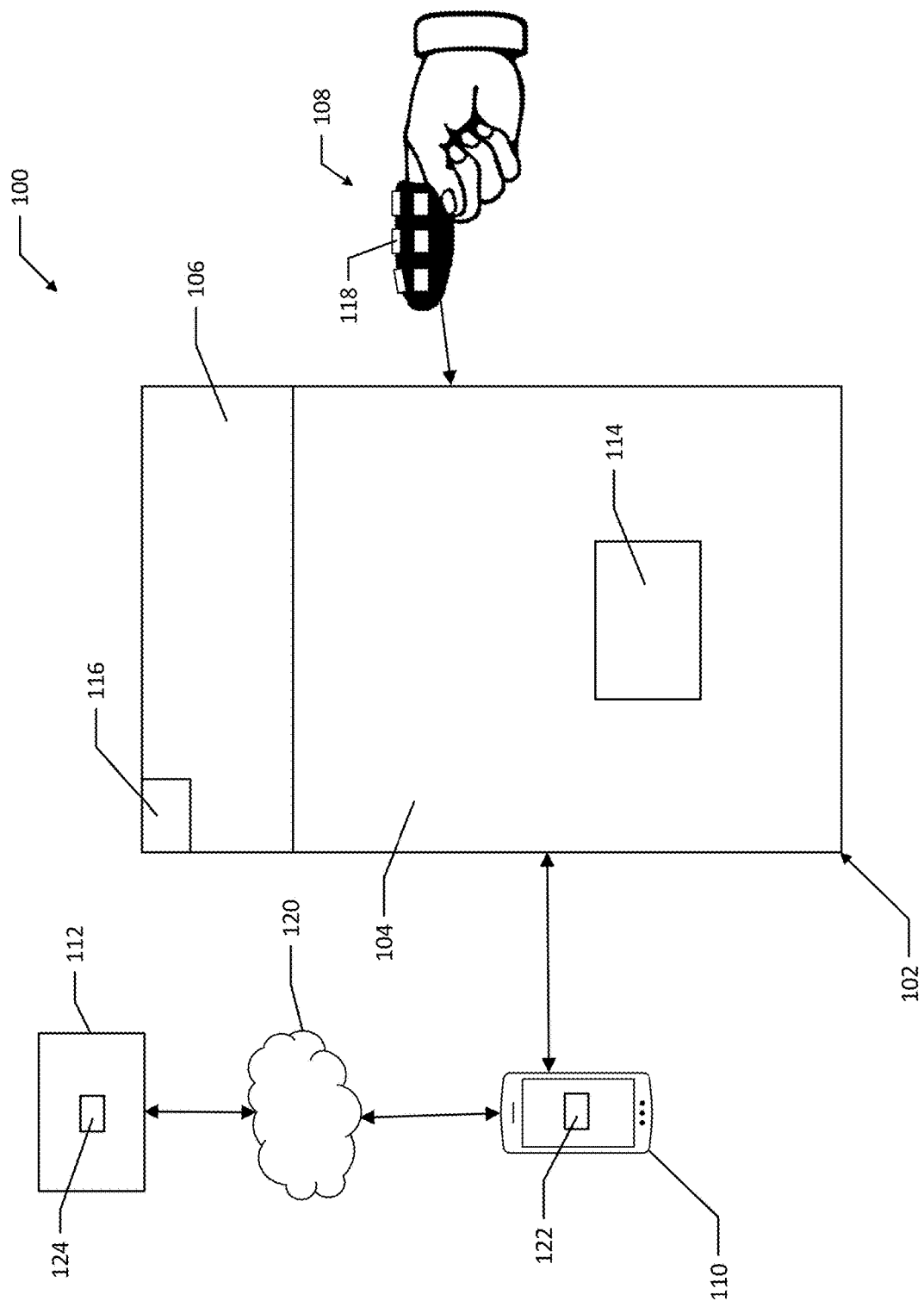
FIG. 1 illustrates a system, according to an embodiment of the present disclosure.

FIG. 1 illustrates an example system 100 of the present disclosure. The example system 100 includes a prayer rug 102. The prayer rug 102 may communicate with a wireless controller 108. The prayer rug 102 may also communication with an external device 110. The prayer rug 102 and/or the external device 110 may communicate with a server 112.

The example prayer rug 102 includes one or more pressure sensors 104, one or more proximity sensors 114, and a display screen 106. The prayer rug 102 may also include at least one speaker 116. In various examples, the prayer rug 102 may include one or more of a processor, a microcontroller, and a memory that are not illustrated. In such examples the processor and/or microcontroller are in communication with the memory. The one or more pressure sensors 104 are capable of sensing a change in pressure over a substantial portion of the prayer rug 102, for example, half, two-thirds, three-fourths, or more of the surface of the prayer rug 102. This allows a person of any height and shape to be able to perform prayer postures comfortably on the prayer rug 102 without having to strain to activate sensors in specific areas of the prayer rug 102. The one or more proximity sensors 114 may be any suitable proximity sensor that is capable of detecting how far away an object is, and in particular how far away a portion of an individual's body is, from the one or more proximity sensors 114.

In some aspects, the display screen 106 may be at the head of the prayer rug 102 as illustrated. In such aspects, the one or more pressure sensor 104 may compose a remaining portion of the prayer rug 102 aside from the one or more proximity sensors 114. In some aspects, the one or more speakers 116 may be integrated with the display screen 106. In other aspects, the one or more speakers 116 may be separate from display screen 106 and located anywhere on the prayer rug 102. The display screen 106, in other aspects, may be located in a middle portion of the prayer rug 102. In such other aspects, the one or more pressure sensors 104 may be located at the head of the prayer rug 102. The display screen 106 need not extend to the edges of the prayer rug 102. In some examples, the one or more pressure sensors 104 may enclose the display screen 106.

In various instances, a praying individual may control the display screen 106 on the prayer rug 102 by using a wireless controller 108. For example, the praying individual may turn the display screen 106 on or off, or may change what is displayed, through using the wireless controller 108. The wireless controller 108 may communicate with the prayer rug 102 using any wireless communication method, for example, a chosen radio frequency or Bluetooth. In some examples, the wireless controller 108 is a finger sleeve that is worn on a praying individual's finger as illustrated. The finger sleeve may have multiple buttons 118 that the praying individual can press to control the display screen 106. In other examples, the wireless controller 108 may be a ring, bracelet, prayer beads, or any other item capable of being used while leaving the hands and fingers free for prayer.

In some aspects of the present disclosure, the example prayer rug 102 may be wirelessly connected to an external device 110 such as a smart phone, laptop, tablet, desktop computer, or any other electronic device. The external device 110 includes a processor in communication with a memory. The external device 110 processor may execute software stored in the memory. The example prayer rug 102 may be wirelessly connected to such an external device 110 using any wireless data communication method, for example, Bluetooth or WiFi. In some aspects of the present disclosure, the external device 110 and/or the prayer rug 102 may be connected to a server 112 over a network 120. The server 112 includes a processor in communication with a memory. The server 112 processor may execute software stored in the memory. The network 120 can include, for example, the Internet or some other data network, including, but not limited to, any suitable wide area network or local area network.

In various examples of the present disclosure, the prayer rug 102 may communicate with a software application 122 hosted on the external device 110. In other examples, the software application 122 may be hosted on the server 112. The prayer rug 102 may transmit the pressure information from the pressure sensors 104 to the external device 110 and/or the server 112 hosting the software application 122. The prayer rug 102 may also transmit the proximity information from the proximity sensors 114 to the external device 110 and/or the server hosting the software application 122. The software application 122 may provide for any number or type of functions or actions to aid a praying individual in interacting with the prayer rug 102. For example, in some aspects, the software application 122 may track and analyze the prayers performed by the praying individual and offer suggestions, give reminders for prayers at predetermined times or if a prayer is missed, provide tracking for parents to track children's prayers, and/or control any options or features of the prayer tug 102.

The software application 122 is able to continuously analyze the pressure and/or proximity information received from the prayer rug 102 and track an individual's prayer. For example, the software application may track whether an individual started his or her prayer and whether it was completed. In another example, the software application 122 may track whether an individual performed the prayer postures correctly during the individual's prayer. The combination of pressure information and proximity information enables the software application 122 to determine the prayer postures with a high degree of accuracy. In some examples, the prayer rug 102 itself may store the software application 122. In such examples, the microcontroller and/or processor of the prayer rug 102 may execute the software application 122.

In some aspects of the present disclosure, the external device 110 and/or the server 112 may host a machine learning model 124. The software application 122 may communicate received pressure and proximity information to the machine learning model 124. The machine learning model 124 may analyze the received pressure and proximity information to help improve detection processes of the software application 122. For instance, the machine learning model 124 may enable the software application 122 to be better able to distinguish between prayer postures by analyzing the pressure and proximity information received. The machine learning model 124 may also better enable the software application 122 to determine whether a prayer posture was completed correctly by analyzing the pressure and proximity information received. The machine learning model 124 may be any suitable machine learning model.

For example, the software application 122 may be able to distinguish between standing and bowing postures by using the pressure information resulting from an individual's feet on the prayer rug 102. For instance, an individual's center of gravity, and thus the amount of weight placed on various areas of the individual's foot, is different between a standing and a bowing posture. The different weight placement activates different pressure points or results in different pressure placed on already activated pressure points. The software application 122 may use that pressure information, along with the change in the center of gravity of an individual's body, to differentiate between standing and bowing postures.

The software application 122 may also differentiate between sitting and prostration by analyzing the pressure points that an individual activates on the prayer rug 102 (e.g., pressure information). For instance, more pressure points are activated when prostrating than when sitting, and in different areas of the prayer rug 102. In another example, the software application 122 may be able to distinguish between standing and bowing postures by using the proximity information resulting from portions of an individual's body being closer or farther from the proximity sensors 114. The combination of pressure information and proximity information enables more accurate posture determination as compared to typical smart prayer rugs.

In various examples, if the software application 122 detects that an individual performed, or is performing, an incorrect posture, the software application 122 may cause the display screen 106 and/or the one or more speakers 116 to give visual or audible feedback to the individual. For example, in Muslim prayer, it is a wrong posture if, while prostrating, one's feet do not touch the floor or one's nose and forehead do not touch the floor, or if one prostrates with his or her fists. By analyzing the pressure information from the pressure sensors 104, the software application 122 is able to determine where every part of an individual's body is touching the prayer rug 102, and thus may detect a wrong posture and provide feedback. In some aspects, feedback will be given immediately upon the determination that a posture is or was wrong. In other aspects, the feedback will be given after the prayer has been completed or at any other suitable time.

In some examples of the present disclosure, the software application 122 may include a learning mode that teaches individuals how to complete the required prayers. For example, the software application 122 may cause the display screen 106 to display instructions to a praying individual regarding what the individual should do. Additionally or alternatively, the software application 122 may cause the one or more speakers 116 to output audible instructions telling the individual what to do or how to pronounce various Arabic words correctly. The displayed or audible information can be in multiple languages, translated, or transliterated. In such instances, the displayable or audible information may be stored in multiple languages in the memory of the external device 110, the memory of the server 112, and/or the memory of the prayer rug 102.

Figure 2:
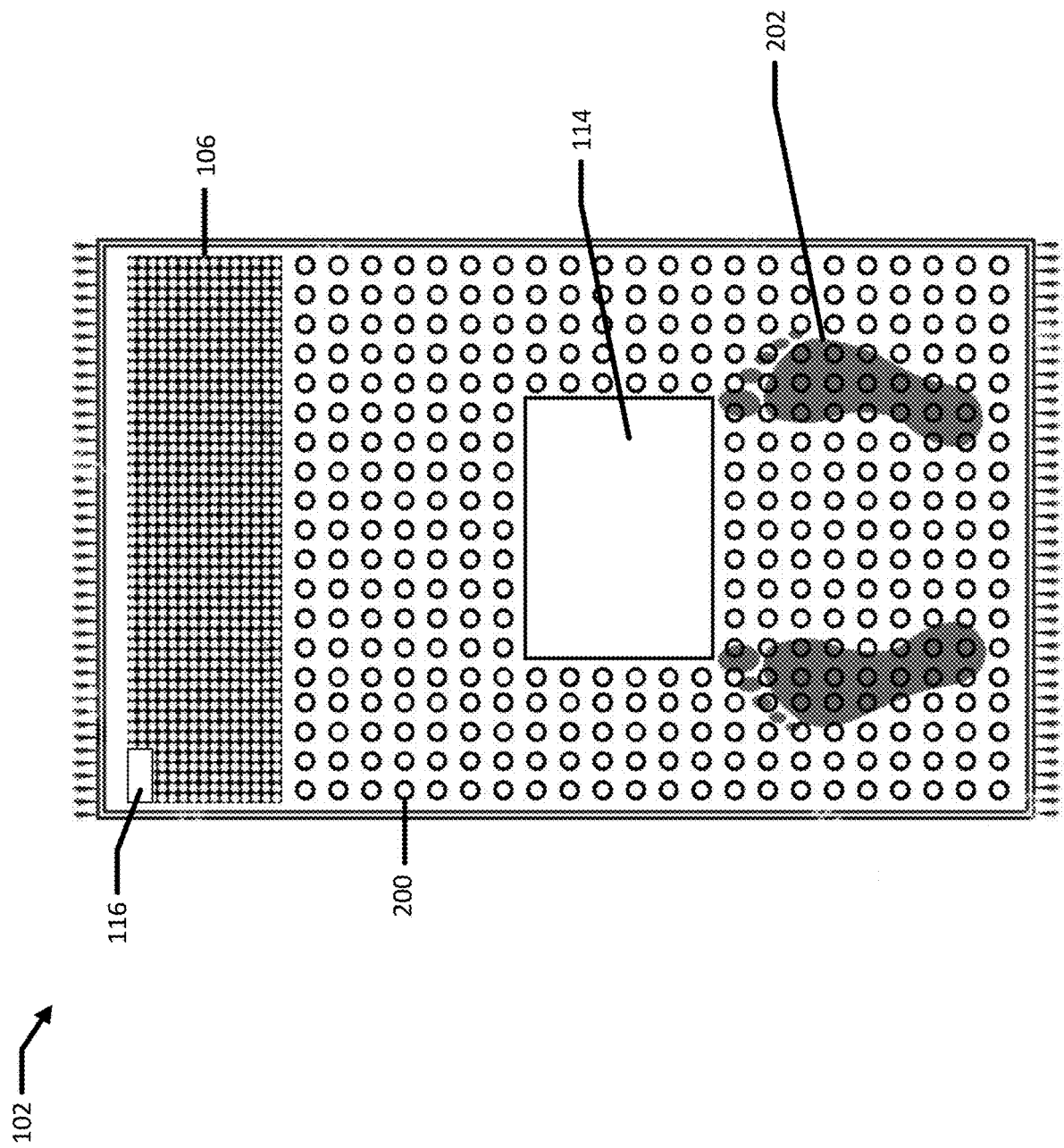
FIG. 2 illustrates a top view of a prayer mat, according to an embodiment of the present disclosure.

FIG. 2 illustrates a top view of the example prayer rug 102. The example prayer rug 102 is illustrated with an example array of pressure points 200 that cover the entirety of the prayer rug 102 except for the locations of the display screen 106, the one or more speakers 116, and the proximity sensor 114. The one or more pressure sensors 104 are configured to generate the array of pressure points 200. The array of pressure points 200 detects areas of the prayer rug 102 at which individuals apply pressure to the prayer rug 102. For instance, the footprints 202 illustrate where individuals typically stand during prayer when on the prayer mat 102. Pressure information may be obtained from the pressure points 200 of the one or more pressure sensors 104 that are activated underneath an individual's feet at the footprints 202. For example, individuals may apply a greater amount of pressure to some of the pressure points 200 as compared to others depending on how the individuals distributes their weight on their feet. The one or more proximity sensors 114 detect how far away a portion of the individual's body is from the one or more proximity sensors 114. The combination of the pressure information from the pressure sensors 104 and the proximity information from the proximity sensors 114 aid in the differentiation and detection between different postures.

Figure 3:
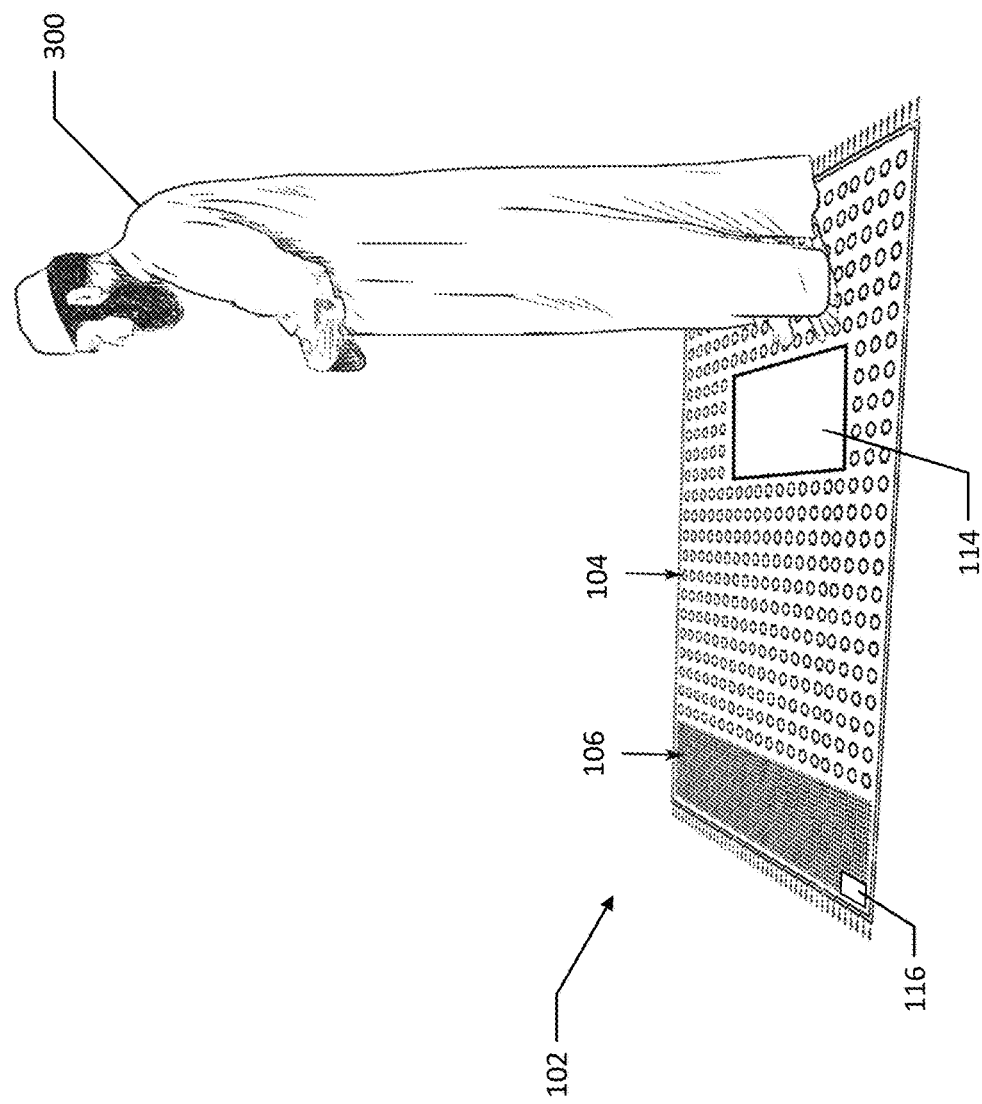
FIG. 3 illustrates an individual standing at the foot of a prayer mat, according to an embodiment of the present disclosure.
Figure 4:
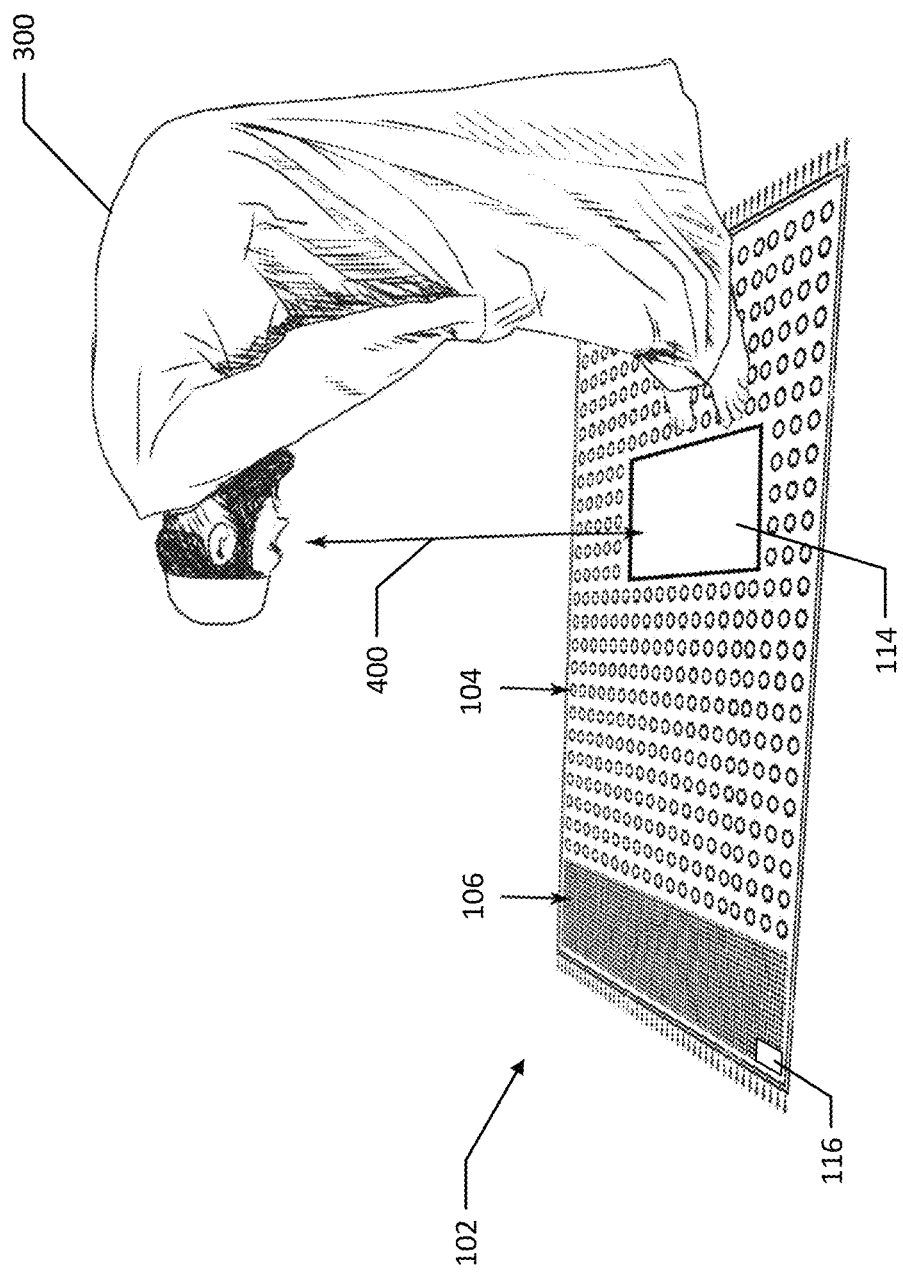
FIG. 4 illustrates an individual bowing at the foot of a prayer mat, according to an embodiment of the present disclosure.

The proximity information from the proximity sensors 114 is especially important for determining whether an individual is standing or bowing. For example, FIG. 3 illustrates an example of an individual 300 standing at the foot of the prayer rug 102. Since no part of the individual is above the proximity sensor 114, the proximity sensor 114 does not generate any proximity information, or generates proximity information including that no object is detected. Certain portions of a prayer may then require the individual 300 to how as illustrated in FIG. 4. When the individual 300 bows, the head of the individual 300 is over the proximity sensor 114, which senses a distance 400 that the head of the individual 300 is away from the proximity sensor 114. In this way, the prayer rug 102 and/or the software application 122 can detect that the individual 300 is bowing.

In other examples, the individual 300 may be kneeling and the head of the individual 300 may be even closer to the proximity sensor 114. In such examples, the distance 400 detected by the proximity sensor 114 may indicate to the prayer rug 102 and/or the software application 112 that the individual 300 is kneeling. For instance, a threshold distance 400 may indicate whether an individual is standing or kneeling. If a distance 400 output from the proximity sensor 114 is above (or equal in some aspects) the threshold distance 400, then it may be determined the individual is standing. If a distance 400 output from the proximity sensor 114 is below (or equal in some aspects) the threshold distance 400, then it may be determine the individual is kneeling.

Figure 5B:
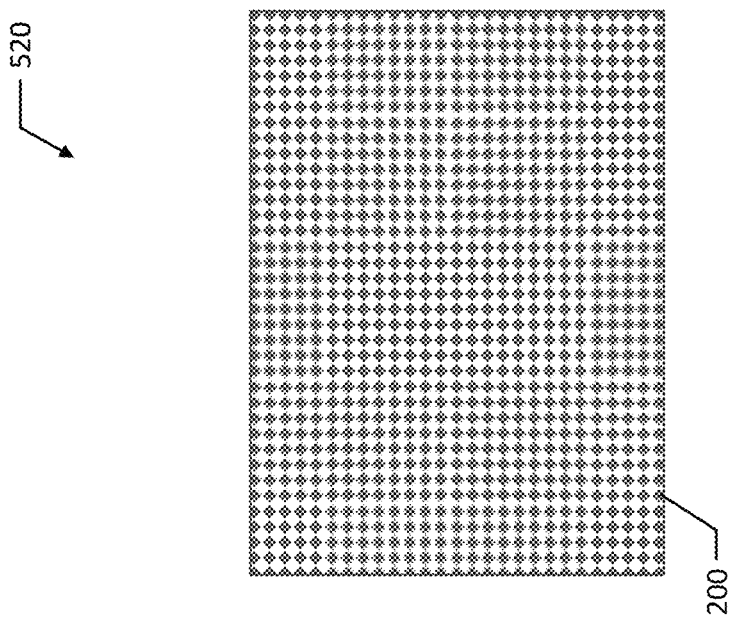
FIGS. 5A and 5B illustrate an example pressure sensor construction, according to an embodiment of the present disclosure.
Figure 5A:
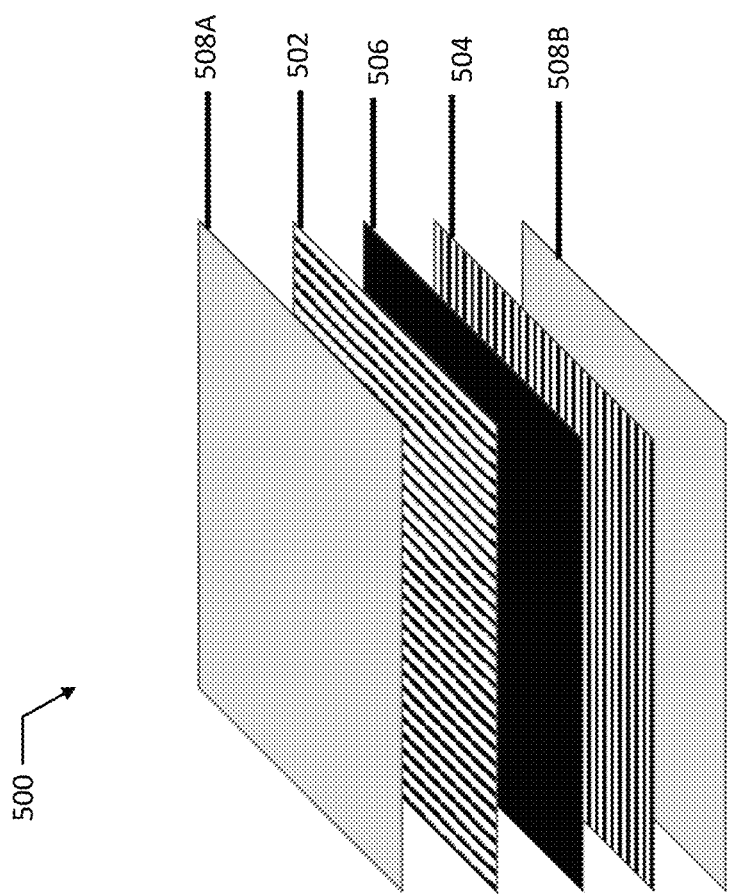

FIG. 5 illustrates an example construction 500 of a portion of the prayer rug 102 including the one or more pressure sensors 104. The one or more pressure sensors 104 may include three layers. The first layer 502 may include parallel conductive columns oriented in a first direction. The second layer 504 may include parallel conductive rows oriented in a second direction that is perpendicular to the first direction of the conductive columns. The conductive columns and rows may both electrically connect to a microcontroller or processor in the prayer rug 102. The third layer 506 is in between the first layer 502 and the second layer 504 and may be a pressure-sensitive conductive sheet of material (e.g., Velostat or Linqstat). Enclosing the first layer 502, second layer 504, and the third layer 506 are non-conductive layers 508A and 508B. The non-conductive layers 508A and 508B may be fabric or other suitable non-conductive material that contacts individuals' skin while they are performing prayers.

In this example construction 500, each intersection of a single conductive column of the first layer 502 and single conductive row of the second layer 504 creates a pressure point (e.g., a pressure point 200). FIG. 5B illustrates an example matrix 520 of pressure points 200. In other examples, each pressure point 200 may be an individual pressure sensor. In various examples, the prayer rug 102 may have more than two thousand pressure points or sensors.

Figure 6:
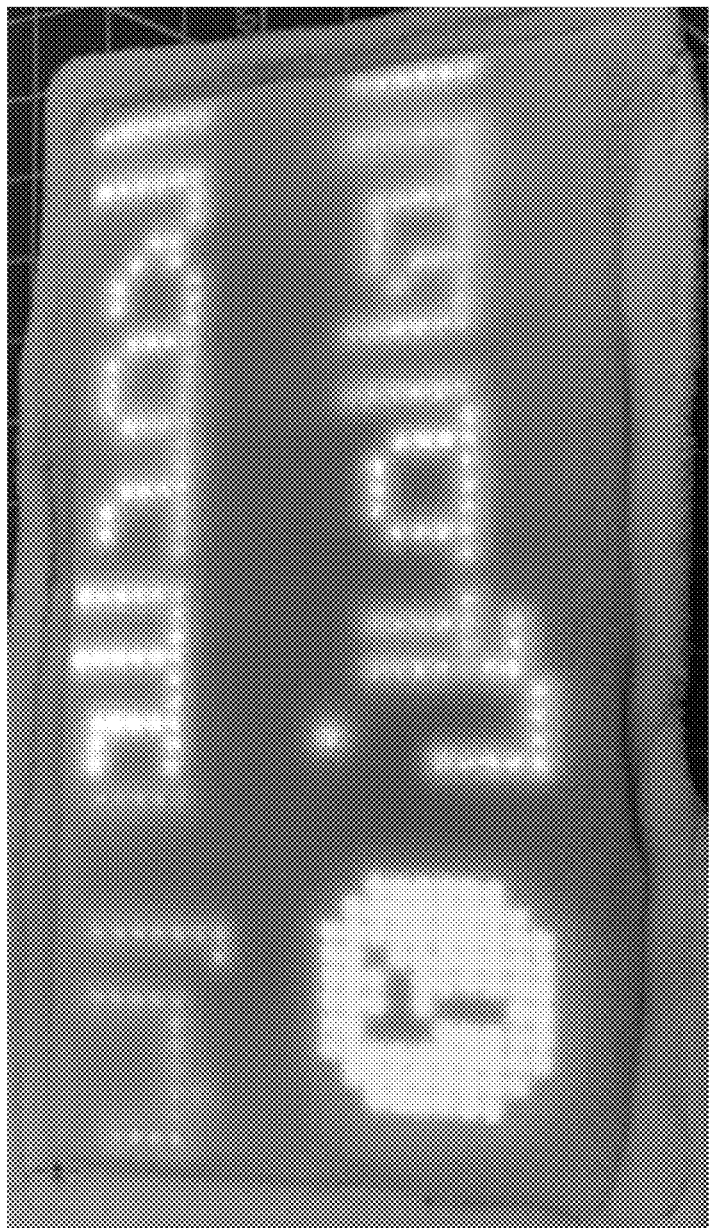
FIG. 6 illustrates an example configuration of a display screen integrated into a rug material, according to an embodiment of the present disclosure.

FIG. 6 illustrates an example display screen 106 integrated into an example prayer rug 102 material. For example, the display screen 106 may be an integrated LED dot matrix display. In such examples of the present disclosure, the display screen 106 may be integrated within the prayer rug 102 material in any suitable manner such that it is not easily removable. In other examples, the display screen 106 may be a separate component that may be easily removed from and inserted into the prayer rug 102.

The display screen 106 may display any suitable information. For example, in various instances, the display screen 106 may display images of the Quran and Dua, such as various prayer verses. The display screen 106 may also show a count of prayer rakahs to help an individual not lose track during prayer. Post prayer Adhkaar may also be displayed as well as various prayer instructions (e.g., what to say) and feedback. The information can be displayed in multiple languages, translated, or transliterated Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

If a software function unit is realized and used as a product, it can be stored in a readable storage medium in a computer. Based on this understanding, the technical plan proposed by the present disclosure may be essentially or partially realized as a software product. In other cases, one or more parts of the above-described systems and methods that are beneficial to the conventional technology may be realized as the form of a software product. The software product may be stored in a storage medium, including one or more instructions for a computational device (such as a personal computer, a server, or a network device) to perform all or some of the steps disclosed by the embodiments of the present disclosure. The storage medium may include one or more media capable of storing program codes, such as one or more of a USB disk, a mobile hard disk, a read-only memory (ROM), a random-access memory (RAM), and a floppy disk.

The invention is claimed as follows:

1. A system comprising:
   a prayer rug including:
      a display screen,
      one or more proximity sensors configured to sense a distance away an object is from the one or more proximity sensors and output proximity information,
      one or more pressure sensors configured to sense a change in pressure applied at a plurality of pressure points and output pressure information, wherein the plurality of pressure points are configured such that the one or more pressure sensors sense a change in pressure across at least two-thirds of a surface of the prayer rug;
   a wireless controller in communication with the prayer rug, wherein the wireless controller is configured to change what is displayed on the display screen;
   a memory storing prayer posture information including posture information for a plurality of prayers; and
   a processor in communication with the memory, the processor configured to:
      receive the pressure information from the one or more pressure sensors,
      receive the proximity information from the one or more proximity sensors,
      determine a prayer posture of an individual based on the received pressure information and the received proximity information,
      compare the determined prayer posture with the stored prayer posture information, and
      generate an alert if the determined prayer posture does not match the stored prayer posture information,
   wherein the one or more pressure sensors include a first layer having parallel conductive columns oriented in a first direction and a second layer having parallel conductive columns oriented in a second direction, the first direction being perpendicular to the second direction, wherein each intersection of the parallel conductive columns of the first layer and the parallel conductive columns of the second layer is a pressure point of the plurality of pressure points.

2. The system of claim 1, wherein prayer rug further includes a microcontroller, and wherein the processor is a processor of an external device in communication with the microcontroller.

3. The system of claim 2, wherein the microcontroller is configured to transmit the pressure information and the proximity information to the processor of the external device.

4. The system of claim 1, wherein the processor is further configured to process the received pressure information or the received proximity information with a machine learning model.

5. The system of claim 4, wherein the machine learning model is stored on an external server.

6. The system of claim 1, wherein the prayer rug further includes one or more speakers.

7. The system of claim 6, wherein the alert includes audio emitted from the one or more speakers.

8. The system of claim 6, wherein the one or more speakers are integrated with the display screen.

9. The system of claim 1, wherein the display screen is integrated within the prayer rug.

10. A prayer rug including:
a display screen;
one or more proximity sensors configured to sense a distance away an object is from the one or more proximity sensors and output proximity information;
one or more pressure sensors configured to sense a change in pressure applied at a plurality of pressure points and output pressure information, wherein the plurality of pressure points are configured such that the one or more pressure sensors sense a change in pressure across at least two-thirds of a surface of the prayer rug;
a memory storing prayer posture information including posture information for a plurality of prayers; and
a processor in communication with the memory, the one or more proximity sensors, and the one or more pressure sensors, the processor configured to:
receive the pressure information from the one or more pressure sensors,
receive the proximity information from the one or more proximity sensors,
determine a prayer posture of an individual based on the received pressure information and the received proximity information,
compare the determined prayer posture with the stored prayer posture information, and
generate an alert if the determined prayer posture does not match the stored prayer posture information,
wherein the one or more pressure sensors include a first layer having parallel conductive columns oriented in a first direction and a second layer having parallel conductive columns oriented in a second direction, the first direction being perpendicular to the second direction, wherein each intersection of the parallel conductive columns of the first layer and the parallel conductive columns of the second layer is a pressure point of the plurality of pressure points.

11. The prayer rug of claim 10, wherein the processor is further configured to display prayer instructions on the display screen, wherein the prayer instructions are based on the stored prayer posture information.

12. The prayer rug of claim 10, wherein the processor is further configured to detect completed prayer sessions and transmit information based on the completed prayer sessions to an external device.

13. The prayer rug of claim 10, wherein a third layer of pressure-sensitive conductive material is disposed between the first layer and the second layer.

14. The prayer rug of claim 10, wherein the alert includes displaying a message on the display screen.

15. A method comprising:
receiving pressure information from one or more pressure sensors, the one or more pressure sensors including a plurality of pressure points;
receiving proximity information from one or more proximity sensors, the proximity information including a distance an object is detected from the one or more proximity sensors;
determining a prayer posture of an individual based on the received pressure information and the received proximity information;
comparing the determined prayer posture with stored prayer posture information including posture information for a plurality of prayers; and
generating an alert if the determined prayer posture does not match the stored prayer posture information,
wherein determining the prayer posture includes detecting a change in the individual's center of gravity based on the received pressure information to differentiate between standing and bowing postures.

16. The method of claim 15, wherein determining the prayer posture includes comparing the received distance to a threshold distance value.

17. The method of claim 15, wherein determining the prayer posture includes detecting whether the individual is sitting or prostrating based on the received pressure information.

18. The method of claim 15, wherein the pressure information includes information on which pressure points of the plurality of pressure points provided the pressure information, and wherein determining the prayer posture includes determining a quantity of pressure points that provided the pressure information.

* * * * *